Nov. 19, 1935.  L. C. VERMAN ET AL  2,021,161
ELECTRICAL CIRCUIT
Filed June 5, 1931
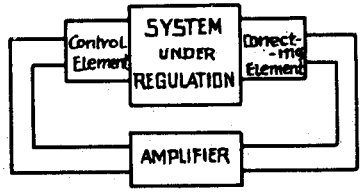
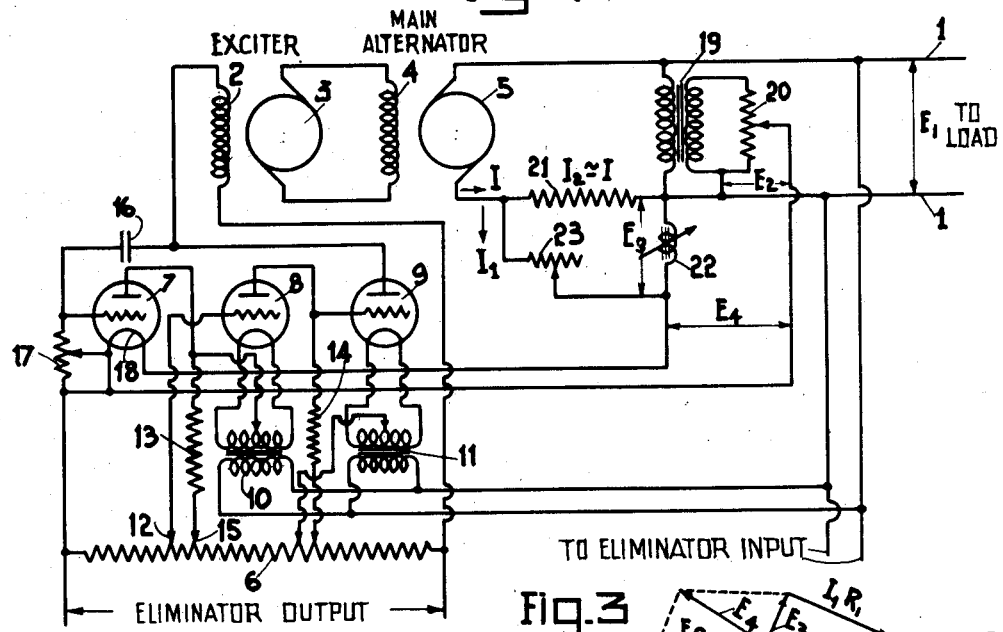
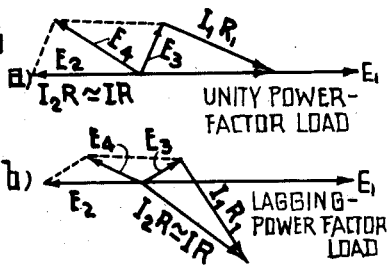
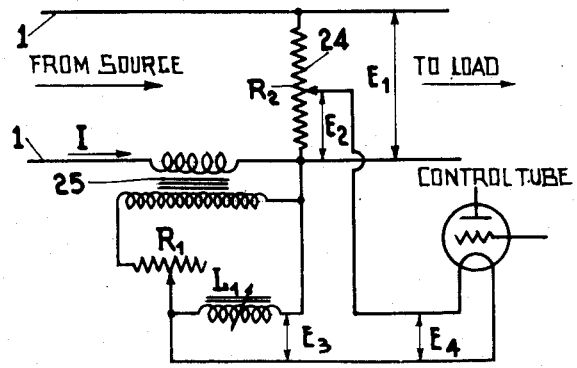
INVENTORS
LAL C. VERMAN AND
LORENZO A. RICHARDS
BY
*Marl Nam*
ATTORNEY Patented Nov. 19, 1935

2,021,161

UNITED STATES PATENT OFFICE 2,021,161

ELECTRICAL CIRCUIT

Lal C. Verman and Lorenzo A. Richards, Ithaca, N. Y., assignors, by mesne assignments, to Radio Corporation of America, a corporation of Delaware Application June 5, 1931, Serial No. 542,294

20 Claims. (Cl. 172—246)

Our invention relates to novel methods of and apparatus for amplifying signals and more particularly refers to novel methods of and apparatus for operating vacuum tube amplifiers in regulating systems, such as regulating of electrical quantities or other physical quantities, including temperature, speed, light, sound, and so forth.

One of the problems which has heretofore remained unsolved in the operation of regulators is the elimination of periodic occurrences known as hunting or oscillations. Hunting or oscillations is generally caused by the time lag which exists between the exercise of the correcting influence and the effect of this influence on the quantity to be controlled.

Thus, for example, if the voltage of an electric generator is to be regulated, the response of the regulator impressed upon the field circuit of the generator does not result in an immediate rise of the generator voltage, but due to the slow change of the magnetic field a time lag appears and by the time the voltage of the generator has been brought to its normal value, the regulator would have overshot, with regard to its correcting influence, and the effect of correction would thus continue after the need for it has already been taken into account.

By carrying this analysis further, it will be seen that a state of oscillation is thus obtained.

In the regulator, in accordance with our invention, a substantially instantaneous response to minute changes in the quantity to be regulated is obtained by the use of electrical apparatus having substantially no inertia and which are not subject to mechanical limitations, such as inertia, corrosion of vibrating contacts, accumulation of dirt, changes in friction, and so forth.

Accordingly, an object of our invention is to provide means for regulating electrical quantities utilizing electrical elements only.

Another object of our invention is to provide means for eliminating the so-called hunting effect in regulating.

A further object of our invention is to provide means for using an electronic stream from a heated filament as a control element.

A further object of our invention is to provide an electrical network responsive to changes in load current and load power factor for exercising a regulating influence.

We have illustrated our invention in reference to accompanying figures, of which:

Figure 1 illustrates diagrammatically the general features of a regulating system.

Figure 2 illustrates an embodiment of our regulator arrangement.

Figures 3a, 3b, and 3c are vectorial diagrams for illustrating the operation of the circuit of Figure 2, and Figure 4 is an alternative network suitable for the same purposes as Figure 2.

Referring to Figure 1, the system under regulation which may be of any physical form and which is to be controlled, is connected to a control element which translates a variable physical condition into corresponding electrical variations. These electrical variations are applied to the amplifier which amplifies these electrical variations and applies the amplified variations to the correcting apparatus. The correcting apparatus is actuated by the amplified variations and reacts on the system which is to be regulated in such a way as to correct for the deviation from the normal condition.

Figure 2 shows one embodiment of the invention applied to a regulator adapted for generators of alternating current. Operation of this regulator involves conversion of fluctuations of voltage on the alternating current line 1 into direct current, amplifying these fluctuations, and applying them to the field 2 of an exciter 3 which supplies the main field 4 of the alternating current generator 5, thus controlling the line voltage on the terminals 1.

The amplifying system is the direct resistance coupled type. All the grid bias and plate voltages may be supplied from taps on resistance 6 through a single rectifier and filter system operated from the alternator 5 which is being regulated. The filaments of three tubes, 7, 8, and 9, are lighted directly by alternating current and supplied from the same source through individual transformers, 10, 11 for tubes 8 and 9, and through a system of inductances and resistances to be described later for input or control tube 7. The tube 9 is employed in the last stage to supply the field current to the exciter generator 3 whose field 2 is wound to match the direct current plate resistance of the tube 9. This field winding is the only special piece of apparatus used in the system, all the other parts being standard and readily obtainable. It is desirable to use in the last stage a tube with high current carrying capacity and with high mutual conductance. Devices, such as thyratrons, consisting essentially of a gas filled amplifier tube may also be used.

The amplifier illustrated in this figure is a modification of the direct coupled amplifier heretofore known, this modification being necessitated by the required phase relation between the changes in potential at the input of the amplifier and at the output of the amplifier.

It is known that in an amplifier wherein the output from the plate of one tube is directly connected to the grid of the subsequent tube, the phases of the changes are reversed on each stage. Therefore, with two stages and a consequent double reversal, the phase of the output is exactly the same as of the input; that is, a reduction in the input potential results in a reduction in the output potential.

However, in Figure 2, on account of the reduced sensitivity of the control element and the need of a higher regulating effect, it is necessary to introduce three stages of amplification, or rather, the output of tube 7 has to be amplified in tubes 8 and 9. Since the reduction in the potential on the line 1—1 results in a smaller electronic emission, the impedance of the tube 7 increases, and therefore, there is a rise of potential on the plate. With two ordinary stages of amplification following this tube, there would result a rise in the plate potential of tube 9 and a decrease in the plate current of this tube with a consequent reduction of the line potential, instead of the desired increase.

We have shown, however, as a novel modification of the old style amplifier, a novel current connection for the tube 8. Instead of connecting the grid of tube 8 to the plate of tube 7 and fixing the potential of the cathode of tube 8 by connection to potentiometer 6, as in the case of tube 9, we have provided a direct connection from the plate of tube 7 to the cathode of tube 8 and fixed the potential of the grid of this tube by connecting to a tap 12 of the potentiometer 6. At the same time, we have shown a coupling resistor 13 between the plate of tube 7 and a tap point 15. Thus, since the connections to the input of tube 8 are reversed, there is no reversal of phase in tube 8 and only one reversal of phase in tube 9. As a consequence the rise in potential of the plate of tube 7 results in the lowering in potential of plate 9 and an increase in its current, which is the desired effect to bring in the correction of the reduced voltage.

The first tube 7 is operated at a low filament temperature and high plate voltage so as to obtain saturated plate current. This constitutes the control element of this system. Under these conditions the current through the coupling resistance 13, between the plate of tube 7 and the grid of tube 8, is nearly independent of the plate voltage, but changes rapidly with the filament temperature and hence with the root mean square value of the line voltage at 1.

A grid control for the first tube 7 may be substituted for the filament control by using a small portion of the direct current supply from the rectifier as grid bias, but this it is believed controls the average value of the half cycle wave constituting the output of one rectifier, rather than the root mean square value of the line voltage, since the rectifier output voltage is more closely related to this average value than to the R. M. S. line voltage.

The drop of voltage across 13 is partially compensated for by a small adjustable portion of the rectifier voltage output from the tap and then applied to the grid of the second tube 8, which may have a high amplification factor (a high $\mu$). Thus, a decrease in the line voltage makes the grid of the tube 8 more negative, cutting down the current through coupling resistance 14 between tubes 8 and 9, and making the grid of the tube 9 more positive and building up the line voltage. An increase in line voltage reverses this process.

A much higher amplification is necessary in an alternating current regulator than in a direct current regulator since the regulation characteristics of an ordinary alternator are much worse than those of a direct current generator, particularly one which is flat compounded. This higher sensitivity makes the operation rather unstable, for the vacuum tube system is almost instantaneous in its response to small fluctuations in the line, whereas the time lags in the fields of the exciter and the main alternator are quite considerable. These circumstances cause hunting, that is, oscillation of the line voltage about a mean value. To correct for this the regulator is stabilized by a feed-back coupling system composed of a condenser 16 and a resistance 17 which reacts on the grid of the first tube 7. This provides a delay in the response of the regulator, this eliminating its tendency to over-correct.

In operating, it is necessary to build up the alternator voltage by exciting the main field 4 from a separate direct current supply and then shifting by means of a double throw switch to the output of the exciter generator 3. The starting procedure could be much simplified or made automatic, if desired, by having a self-exciting field on the auxiliary exciter generator 3 with suitable switches or relays for shifting the connections to the regulator when the line voltage approaches normal.

This regulator acts as an automatic overload relay, that is at a predetermined overload point, the voltage drops rapidly to zero. This is due to the fact that the rectifier output and the temperature of the filament of tube 7 drops far enough to make further electron emissions, and therefore, regulation impossible.

Accordingly, after the point of maximum current is reached, the system becomes unstable and the voltage rapidly drops back to zero. This characteristic makes the regulator act as an overload relay. The amount of overload at which the relay action starts depends on the regulation characteristic of the rectifier as well as on the average operating temperature of the first filament.

With 60 cycle supply there is a strong 120 cycle current superimposed on the direct current flowing through the main field. This comes from two sources: first, since the filaments of the tubes are lighted directly from the 60 cycle alternating current, the plate currents of all the tubes contain a 120 cycle component which is carried right through the exciter to the main field; second, the single phase 60 cycle current flowing through the windings of the armature of the main alternator induces in its field circuit a 120 cycle electro motive force.

This 120 cycle component in the field current is an advantage, since the magnetic circuit of the exciter as well as the alternator are continuously carried around a hysterisis loop, thus making the average magnetic flux and hence the generated voltage, always a single valued function of the direct current component through the field, instead of having different values for rising and for falling values of field current. This field current ripple does not cause any distortion in the wave form of the output voltage.

To make the regulated generator have a flat or rising voltage characteristic with increasing load (such as is necessary when it is desired to compensate for line voltage drop), the filament current in the control tube is made to depend on line voltage, line current, and line power factor. It is well known that for leading loads the unregulated generator has a rising voltage characteristic, for unity power factor loads the voltage characteristic drops and for lagging loads it drops even more rapidly, so that the dependence of control filament current on power factor is highly desirable. To accomplish this, two systems of control are possible, one of which is shown in Figure 2.

In Figure 2, the filament 18 of control tube 7 is supplied by a voltage derived from the line voltage and line current through a step-down transformer 19 connected to the lines 1—1, and a potentiometer 20 connected to the secondary winding of this transformer. A relatively small resistance 21 of large current carrying capacity through which almost all the load current passes, is connected in series with line 1. Across resistance 21 is connected a variable inductance 22 and a variable resistor 23.

Vector diagrams 3a, 3b, and 3c explain the action of this system. In this diagram R represents the resistance of 21, $R_1$ the resistance of 23, $R_2$ is the resistance of 20 and $L_1$ the inductance of 22, the currents and voltages being as indicated in Figure 2.

The voltage $E_2$ is adjusted to the required amount by adjusting 20, whereas voltage $E_3$ is adjusted in its phase position and magnitude by adjusting both 22 and 23. For unity power factor (see Figure 3a) voltages $E_2$ and $E_3$ add vectorially to give voltage $E_4$ which acts on the control filament 18. The phase of voltage $E_3$ is so adjusted that as the load current I increases, the total voltage $E_4$ decreases, thus providing for additional correction of line voltage by the regulator.

In this figure, the different voltages correspond to those indicated on Figure 2. It will be seen that the voltage $E_2$ has a phase in direct opposition to the voltage across the line $E_1$ and to the voltage drop IR across the resistor 21. The phase of the voltage $E_3$ across the inductance 22 is lagging behind the voltage $E_2$ or leading with respect to the voltage IR across the resistance 23. The lead of the voltage $E_3$ is 90° in advance of the voltage $I_1R_1$, which corresponds to the voltage drop through the resistor 23 and the combination of $E_3$ and $I_1R_1$ is equal to the voltage IR across the resistor 21. It is evident that if the current I is lagging with respect to the voltage $E_1$, the voltage IR will also lag, but the triangle consisting of $E_3$, $I_1R_1$ and IR will turn with the turning of the vector IR.

Thus, considering that the power factor of the load becomes lagging which will make $E_3$ lag $E_2$ still more (Figure 3b), $E_4$ will suffer a larger decrease. Hence, the control filament will cause the regulator to increase the line voltage still more, as is desired. When the load becomes leading (Figure 3c), $E_3$ tends to add to $E_2$ in such a fashion as to increase $E_4$, which makes the regulator decrease the line voltage, as is desired.

Accordingly, the system shown in Figure 2, when properly adjusted, shall keep line voltage constant irrespective of the load and its power factor. If desired the system may be adjusted to give a rising characteristic of line voltage against line current for all power factors.

The system shown in Figure 4 furnishes another alternative of accomplishing the same thing. In this system, which for simplicity's sake shows only the network between the line and the input of the amplifier, it will be seen that $E_2$ is tapped off directly from the resistor 24 across the line 1 and therefore has the phase of the voltage $E_1$. Thus, the phase of the voltage $E_2$ is opposite to that which was obtained in connection with Figure 4 and illustrated in Figure 3a. However, since the transformer 25 is now inserted in series with one of the lines, the secondary of this transformer has a potential also in the opposite phase of the voltage drop obtained across the resistor 21 of Figure 2. The remainder of the system in the two cases is practically equivalent and the same vector diagrams can be applied with the only revision that the phase of the voltage $E_1$ would be reversed in reference to the remaining vectors.

In light of the above explanation, it is sufficient to say that this system acts exactly like that of Figure 2 except that all the vector voltages are reversed through 180° and behave exactly as explained above, under corresponding load and power factor variations. $E_1$ the line voltage, of course, remains in its original phase position, but since it does not directly enter into the functioning of the system, this matters little.

We claim:

1. In a control system for controlling the electrical conditions of an electrical generator; an electron tube, means for heating the cathode of said electron tube directly from the generated currents of said generator, and means comprising a network of transformers, inductances and resistors arranged between said generator and said cathode to give a predetermined regulating characteristic for all magnitudes of current and power factor.

2. In a control system for controlling the electrical conditions of an electrical generator, a line connected to said generator; an electron tube, means for heating the cathode of said electron tube including a source of potential in phase with the line potential, a source of potential with a definite phase and magnitude relation to the line current, and means including circuit connections for combining said potentials to serve as a heating source for said cathode.

3. In combination with an electrical system; an alternating current machine; means for controlling a physical condition of said machine; a circuit carrying currents responsive to the voltage and current of said machine; a direct coupled amplifier controlled by said circuit, the output of said amplifier controlling said first mentioned means to maintain said physical condition at a predetermined value; and means whereby said first mentioned means is responsive to all changes in current and power factor of said machine.

4. In a system as claimed in claim 3 in which the current in said circuit is composed of the vector sum of two components derived respectively from the voltage and the current of said machine.

5. In a system as claimed in claim 3 in which an electron tube cascade amplifier is provided with conductive coupling from one stage to the succeeding stage and in which the current in said circuit is used to control the electron emissivity of the first tube of said amplifier.

6. In an electrical system including an alternating current generator; means for controlling the voltage produced by said generator; a circuit carrying currents responsive to both voltage and current of said generator and varying in accordance with power factor changes in said circuit; a conductive coupled amplifier controlled from said circuit, the output of said amplifier controlling said first mentioned means for maintaining the voltage of said generator at a predetermined value for all changes in current and power factor.

7. In a system as described in claim 6 in which the current in said circuit is composed of the vector sum of two components derived respectively from the voltage and the current of said generator through a transformer and resistance connected in parallel and in series with the generator.

8. In a system as described in claim 6 in which a cascade amplifier is provided with conductive coupling from one stage to the succeeding stage and in which the controlling current in said circuit is used to vary the electron emissivity of the first tube of said amplifier.

9. In combination, an electrical machine; means for regulating a physical condition of said machine comprising means for obtaining a voltage wave proportional to said characteristic; an electric discharge amplifier having a plurality of discharge tubes, the first of said tubes comprising a heatable cathode and anode electrode; means for controlling the temperature of said cathode in accordance with said voltage wave; further means for applying a positive potential to said anode to maintain the electron emission substantially at saturation during operation; means for controlling said condition by the output of said amplifier and means for governing the input-output phase relationship of said amplifier to secure a final output phase relation irrespective of the number of amplifying stages used.

10. In a system as claimed in claim 9 in which the heating current of said amplifier is normally so adjusted that the amplifier acts as an overload relay by decrease of the amplifying gain by a predetermined excessive voltage change dependent on abnormal variation of said physical condition.

11. In combination, a device having a characteristic to be regulated; means for obtaining a voltage wave proportionate to said characteristic; an electric amplifier comprising a plurality of space discharge tubes; means for controlling said amplifier by said voltage wave; further means for controlling said characteristic by the output of said amplifier; and means for governing the input and output phase relationship of said amplifying stages to secure a final desired output phase relation irrespective of the number of amplifying stages used.

12. In a system for maintaining a predetermined physical condition, an electric discharge amplifier comprising an electron-emissive cathode and anode electrode; means for maintaining said discharge amplifier at saturated condition during operation; means responsive to variations of said physical condition from a predetermined value for varying the output current of said amplifier; means controlled by variations in the output current of said electric discharge amplifier for restoring said physical condition to its predetermined value, and means for compensating phase changes between input and output of said amplifier to secure a desired phase of the output current to correct variations of said condition from its predetermined value irrespective of the number of amplifying stages used.

13. In a system for maintaining a predetermined voltage on a line, an electric discharge amplifier comprising an electron-emissive cathode and anode electrode; means for maintaining said discharge amplifier at saturated condition during operation; means responsive to variations of the line potential from said predetermined voltage for varying the output current of said amplifier; means controlled by variations in the output current of said electrical discharge amplifier for restoring said voltage to its predetermined value and means for compensating phase changes between input and output of said amplifier to secure a desired phase of the output current to correct variations of said condition from its predetermined value irrespective of the number of amplifying stages used.

14. In a system for maintaining a physical condition in a predetermined manner comprising a plurality of amplifying tubes, in cascade conductive coupling connections between said tubes including a connection from one tube directly to the cathode of the succeeding tube; and means including said amplifier circuit responsive to variations of said physical condition from a predetermined value for restoring said physical condition to said value.

15. In combination, a device having a characteristic to be regulated; means for obtaining a voltage wave proportionate to said characteristic; an electric amplifier comprising a plurality of conductive coupled discharge devices in cascade; means for controlling the input of said amplifier in accordance with said voltage wave; and further means for controlling said characteristic by the output of said amplifier, the operating conditions of said amplifier being normally so adjusted that the amplifier acts as an over-load device by sudden decrease of its amplifying gain by a predetermined excessive change of said characteristic.

16. In combination, a device having a characteristic to be regulated; means for obtaining a voltage wave proportionate to said characteristic; a conductive coupled amplifier comprising a plurality of amplifying tubes in cascade; means for controlling the thermionic emission of the input of said amplifier by said voltage wave; further means for deriving anode operating potential for said amplifier from said voltage wave; means for controlling said characteristic by the ouput of said amplifier, the operating potentials of said amplifier being normally so adjusted that the amplifier acts as an over-load device by the sudden decrease of the amplifying gain by a predetermined excessive change of said characteristic from its predetermined normal value.

17. In combination, an electrical machine; means for maintaining the terminal voltage of said machine at a predetermined constant value; a conductive coupled cascade amplifier; means for controlling the input of said amplifier in accordance with variations of said terminal voltage; further means for deriving anode current potential for said amplifier in accordance with said terminal voltage; an exciting circuit of said machine; means for controlling said exciting circuit by the output of said amplifier, the operating conditions of said amplifier being normally so adjusted that the amplifier acts as an over-load device for a predetermined decrease of the terminal voltage below said predetermined constant value.

18. In combination, an electrical machine;

means for maintaining the terminal voltage thereof at a predetermined constant value; an exciting circuit for said machine; a conductive coupled amplifier comprising a plurality of amplifying tubes connected in cascade; means for controlling the heating current of the input of said amplifier in accordance with the terminal voltage of said machine; further means for deriving anode current operating potentials for said amplifier from the terminal voltage of said machine; and means for controlling said exciting circuit by the output of said amplifier, the operating conditions of said amplifier being normally so adjusted as to act as an over-load device through a decrease of the amplifying gain by a predetermined decrease of the terminal voltage below said predetermined value.

19. In combination, an electrically actuated device for operation with predetermined characteristics; means for supplying electrical actuating energy for said device to maintain said predetermined characteristics including a first space discharge device, a second space discharge device, each of said devices having an electron emitting cathode and an anode, the anode of said first space discharge device having a conductive connection to the cathode of said second space discharge device, and an output circuit connecting the second space discharge device to said actuated device; and means for supplying to said first space discharge device input energy derived from said actuating device in accordance with the deviation from said predetermined characteristics.

20. In combination, a device having a characteristic to be maintained at a predetermined value; means for deriving a voltage wave proportional to said characteristic; an electric discharge amplifier having a plurality of amplifying stages; means for controlling the input of said amplifier in accordance with said voltage wave; further means for controlling said characteristic by the output of said amplifier; and means including conductive anode to grid coupling in one stage and anode to cathode coupling between other stages of said amplifier for compensating phase changes between input and output of said amplifier to secure a desired phase of the output current to correct variations of said characteristic from its predetermined value irrespective of the number of amplifying stages used.

LAL C. VERMAN.
LORENZO A. RICHARDS.